United States Patent
Kim et al.

(10) Patent No.: US 7,120,442 B2
(45) Date of Patent: Oct. 10, 2006

(54) METHOD FOR PROVIDING MULTIPLE SERVICES AND APPARATUS FOR THE SAME

(75) Inventors: Ki Jun Kim, Seoul (KR); Young Jo Lee, Kampo-shi (KR); Young Woo Yun, Seoul (KR); Suk Hyon Yoon, Seoul (KR); Soon Yil Kwon, Kampo-shi (KR)

(73) Assignee: LG Electronics Inc., Seoul (KR)

( * ) Notice: Subject to any disclaimer, the term of this patent is extended or adjusted under 35 U.S.C. 154(b) by 463 days.

(21) Appl. No.: 10/213,379

(22) Filed: Aug. 7, 2002

(65) Prior Publication Data
US 2003/0032411 A1 Feb. 13, 2003

(30) Foreign Application Priority Data
Aug. 8, 2001 (KR) .............................. P2001-47750

(51) Int. Cl.
*H04Q 7/20* (2006.01)
(52) U.S. Cl. .................. 455/450; 455/451; 455/452.7; 370/329; 370/335; 370/338
(58) Field of Classification Search ................ 455/450, 455/451, 452.1, 464; 370/329, 335, 338, 370/342, 349
See application file for complete search history.

(56) References Cited

U.S. PATENT DOCUMENTS

| | | | | |
|---|---|---|---|---|
| 6,081,536 A | * | 6/2000 | Gorsuch et al. | 370/468 |
| 6,091,717 A | * | 7/2000 | Honkasalo et al. | 370/329 |
| 6,111,863 A | * | 8/2000 | Rostoker et al. | 370/329 |
| 2002/0090004 A1 | * | 7/2002 | Rinchiuso | 370/468 |
| 2003/0125034 A1 | * | 7/2003 | Weerakoon et al. | 455/450 |

* cited by examiner

*Primary Examiner*—Matthew D. Anderson
*Assistant Examiner*—Sanh Phu
(74) *Attorney, Agent, or Firm*—Fleshner & Kim, LLP

(57) ABSTRACT

The present invention provides a method for providing multiple services and an apparatus for the same in a wireless packet data communication system. It guarantees various qualities of the services to a plurality of users by determining priorities of the mobile stations and an amount of resource allocated to each mobile station, and determining priorities of the multiple services and an amount of resource allocated to each service based on the resource allocated to each mobile station.

23 Claims, 1 Drawing Sheet

METHOD FOR PROVIDING MULTIPLE SERVICES AND APPARATUS FOR THE SAME

CROSS-REFERENCE TO RELATED APPLICATIONS

This application claims the benefit of Korean Application No. P2001-47750, filed on Aug. 8, 2001, which is hereby incorporated by reference as if fully set forth herein.

BACKGROUND OF THE INVENTION

1. Field of the Invention

The present invention relates to a communication system, and more particularly, to a method for providing multiple services to each of a plurality of mobile stations in a communication system and an apparatus for the same.

2. Discussion of the Related Art

A current 1x cdma 2000 system is designed to support voice services and low data-rate services in a circuit switched mode. As the demand of wireless Internet services has increased, a new communication tool for only high data-rate packet, called HDR (High Data Rate) or 1x-EV DO (1x-Evolution Data Only), has been suggested. This HDR or 1xEV-DO is specifically designed for a high data-rate of packet data other than voice services and offers a bandwidth efficiency for a data traffic that is 3 to 4 times greater than the current CDMA system. This technology is ideal for high-speed mobile as well as Fixed wireless Internet services. Besides, there exists another new air interface technology called 1x-EV-DV (1x-Evolution Data and Voice) evolved from 1x-EV. The 1x-EV-DV is capable of providing both high data-rate of the packet data service and voice services of the circuit switched mode at the same time. Moreover, the 1x-EV-DV put forward a system whose voice modes are fully compatible with the current 1x CDMA voice modes, and shared channel services such as 1x-EV-DO for enhanced data services.

In order for the compatibilities of the current 1x cdma 2000, the 1x-EV-DV, reusing all common channels from cdma 2000, supports Radio Configuration (hereafter referred to RC). In addition, it is also composed of shared-channels for packet data services as independent RC formats.

In the 1x-EV-DV system, a plurality of mobile stations receive packet data through one shared-channel. In order to do that, it requires an algorithm to share resources with a plurality of mobile stations.

A scheduler includes the algorithm and thereby efficiently allocates the resources of the shared-channel to each mobile station. By the operation of the scheduler, a system throughput can be vigorously improved. The primary role of the scheduler is to increase the system throughput and simultaneously allocate the resources to each mobile station efficiently. This scheduling method is to allocate limited resources to each mobile station (each user) by considering a channel-link ability and packet transmission delays so as to share one shared-channel.

For instance, data retrieved from a higher layer are saved in a transmission buffer. when the scheduler determines to first send data to a mobile station (user) among the saved data, the data which is first inputted from the higher layer in the buffer is transmitted to the corresponding mobile station first regardless of the data's required quality. In this case, even though services requiring different qualities are supported simultaneously, packet networks handling various qualities of services, such as wireless packet data communication and the Internet, are hardly able to support higher quality of services due to the two required services having equalized qualities.

As described in an above example, there often exists situations that one user utilizes various services having multiple qualities in the process of supporting the packet data communication. Therefore it is obvious to have additional scheme to take a control in order for each service to handle hybrid services in the packet networks.

SUMMARY OF THE INVENTION

Accordingly, the present invention is directed to a method for providing multiple services, an apparatus for the same in a wireless packet communication system that substantially obviates one or more problems due to limitations and disadvantages of the related art.

In order to achieve this accomplishment, the present invention provides a method for providing multiple services and an apparatus for the same in a wireless packet data communication system in order to simultaneously provide a plurality of users with several kinds of qualities of services. An object of the present invention is to provide a flexible wireless data packet service and increase a throughput of a wireless packet communication system.

Furthermore, the present invention provides an apparatus for providing multiple services to each of a plurality of mobile stations in a communication system including a first scheduler determining priorities of the mobile stations and an amount of resources allocated to each mobile station, and at least one second scheduler, based on the allocated resources to each mobile station, determining priorities of the multiple services and an amount of resources allocated to each service.

Preferably, at least one second scheduler determines the priorities of the multiple services by applying a required amount of the resources for each service and a required communication quality respectively.

Preferably, at least one second scheduler allocates more slots and more transmission time to each service having a higher priority than others.

Preferably, the first scheduler and at least one second scheduler are implemented on an upper layer of a physical layer.

In another aspect of the present invention, a method for providing multiple services to each of a plurality of mobile stations in a communication system, includes steps of determining priorities of the mobile stations and an amount of resources allocated to each mobile station, and determining priorities of the multiple services and an amount of resources allocated to each service based on the service priorities within the resources allocated to each mobile station.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawing, which is included to provide a further understanding of the invention and is incorporated in and constitute a part of this application, illustrate embodiment(s) of the invention and together with the description serves to explain the principle of the invention. In the drawing.

DETAILED DESCRIPTION OF THE INVENTION

Figure 1:
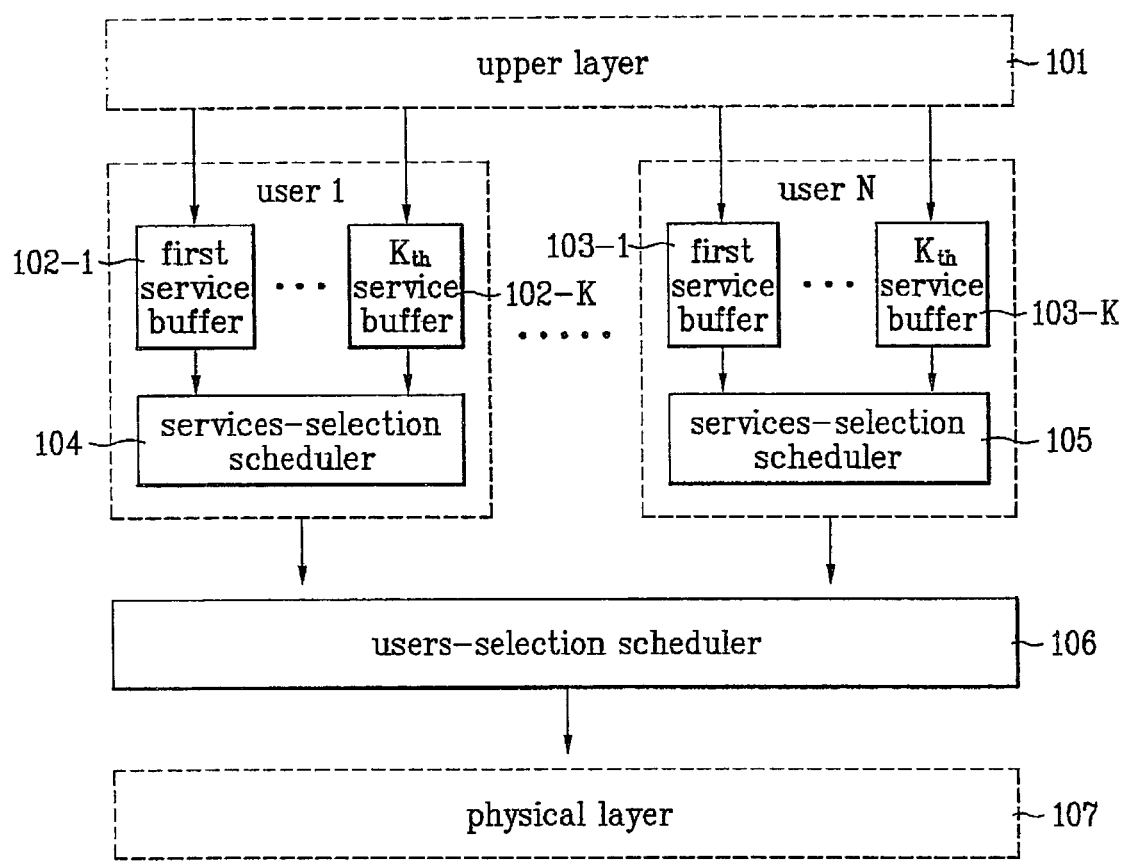
FIG. 1 illustrates a flow chart of scheduling a transmission in a wireless packet data communication system.

Reference will now be made in detail to the preferred embodiments of the present invention, examples of which are illustrated in the accompanying drawings. Wherever possible, the same reference numbers will be used throughout the drawings to refer to the same or like parts.

The present invention suggests a method for scheduling multiple services of upper layers, to guarantee various qualities of the multiple services supported by a communication system.

The communication system is assumed to provide multiple services in a simultaneous way. Herein, proper examples, using a figure, illustrate embodiment(s) of the invention and together with the description serve to explain the principle of the invention.

FIG. 1 illustrates a flow chart of scheduling a transmission in a wireless packet data communication system.

Referring to FIG. 1, data generated in the upper layer is classified for users first, and then the data classified for each user is again classified for different services. After the second classification, the data are respectively saved in several service-types of buffers (102-1, 102-k 103-1 to 103-k).

Services-selecting schedulers 104 and 105 of the upper layer for each user determine the priorities of services supported by the corresponding data stored in the buffers (102-1, 102-k, 103-1 to 103-k) in order to allocate more resources to the higher prioritized service. Also, the services-selecting schedulers 104 and 105 for each user, in case that the system is unable to support multiple services to each user, determine which service should be provided first on its own.

A users-selecting scheduler 106 of a lower layer is designed to determine the priorities of the users in order to allocate more resources to a higher prioritized user on the purpose of efficiently sharing the limited resources with a plurality of users. That is, the users-selecting scheduler 106 selects the higher prioritized user first and allocates much more resources than the others to the selected user.

The users-selecting scheduler 106 performs a scheduling for the users without discriminating a service corresponding to the data provided from the upper layer for better system performance. Likewise, in order to efficiently allocate resources to the users, the scheduler has a dual structure for independently scheduling for the services and the users.

The detail operation of the scheduler is the following.

The services-selection schedulers 104 and 105 allocate the resources provided from the users-selecting scheduler 106, such as a transmission time, slots, or a resource bandwidth, to each data corresponding to the services in accordance with the allocated priorities. The services-selection schedulers 104 and 105 for each user, when the system is unable to support multiple services, determine which service should be provided first on its own.

The services-selection schedulers 104 and 105, when the system can provide multiple services to the users, allocates relatively more resources among the entire service resources to the data corresponding to the service having a higher priority. For instance, if one user demands two simultaneous services from the system and one of them requires a different throughput of the data compared to other, the system allocates more time slots to the corresponding user and then starts to perform a schedule for the two required services. Thereafter, the service selection-scheduler (one of 104 and 105) determines which service-type of data from the two service types of data should be transmitted first. At this time, the scheduler can guarantee the quality of service by providing the higher priorities regarding the services requiring better qualities of service or larger bandwidth demands.

In other words, the service demanding a higher quality of service (QoS) gets more time slots compared to ones with lower QoS. In a physical meaning, it allocates more bandwidth to the service demanding higher QoS than the lower QoS. Therefore, the present invention forming a dual structure of scheduling method can better control qualities of multiple services without interfering with current deployed schedulers. In addition, the dual-structured scheduler selects users in order to improve the system's performance even though it does not knowing the service type of packets currently received at the physical layer.

On the other hand, the scheduler of the upper layer, depending on the required quality of services by users, selects the data forwarding to the lower layer regardless of the physical layer. Throughout the described processes, the control of quality of multiple services can be done without interfering the performance of the current deployed system.

As describe above, the present invention achieves the following advantages.

First, in the current wireless packet data communication, the control over the qualities of multiple services becomes feasible, which hasn't been done. As a result, the services demanding higher qualities are possible to support persistently.

Second, by forming a dual-scheduling structure, the control over the quality of multiple services can be performed without transforming the current system. Thanks to this, more demanded various services in the telecommunication system can be accommodated robustly.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An apparatus for providing multiple packet data services to each of a plurality of mobile stations using a packet data channel in a communication system, comprising:
    a first scheduler configured to determine priorities of the mobile stations and to determine an amount of resources allocated to each mobile station based on the determined priorities; and
    at least one second scheduler, located at a base station, configured to determine an order of priorities of the multiple packet data services for each mobile station and to determine an amount of resources allocated to each packet data service of the multiple packet data services based on the amount of resources allocated to each mobile station by the first scheduler.

2. The apparatus of claim 1, wherein the at least one second scheduler determines the order of priorities of the multiple packet data services based on a required Quality of Service (QoS) for each packet data service.

3. The apparatus of claim 2, wherein the at least one second scheduler allocates more slots and more transmission time to each packet data service having a higher priority than others.

4. A method for providing multiple packet data services to each of a plurality of mobile stations using a packet data channel in a communication system, comprising:
  determining priorities of the mobile stations;
  determining an amount of resources allocated to each mobile station based on the determined priorities of the mobile stations;
  determining an order of priorities of the multiple packet data services for each mobile station; and
  determining at a base station an amount of resources allocated to each packet data service of the multiple packet data services based on the determined order of packet data service priorities and the determined amount of resources allocated to each mobile station.

5. The method of claim 4, wherein the multiple packet data services are determined based on a required Quality of Service (QoS) for each packet data service.

6. The method of claim 4, wherein more slots and more transmission time are allocated to each packet data service having a higher priority than others.

7. A dual structured scheduler for providing multiple packet data services to each of a plurality of mobile users using a packet data channel in a communication system, comprising:
  a first scheduler configured to determine priorities of each user and to determine a quantity of communication resources allocated to each user based on the determined priorities of each user; and
  second schedulers, located at a base station, configured to determine a priority of each inputted packet data in service-wise regarding each user receiving the inputted packet data and a quantity of communication resources for corresponding packet data services based on the priority of each inputted packet data,
  wherein the second schedulers allocate the communication resources to each packet data service based on the determined quantity of the resources allocated by the first scheduler.

8. The scheduler of claim 7, wherein the second schedulers further include a plurality of buffers configured to save data outputted according to the priority of each packet data service.

9. A multiple services allocation method for providing multiple packet data services, comprising:
  first determining a call priority and an amount of resources required to support a request packet service for each mobile terminal among a plurality of mobile terminals requesting packet services based on the determined call priority; and
  second determining at a base station, for each mobile terminal, priorities for different packet data services requested by the corresponding mobile terminal and an amount of resources required to support the different packet data services requested by the corresponding mobile terminal based on the priorities for different packet data services and the amount of resources determined for the corresponding mobile terminal.

10. The method of claim 9, further comprising:
  assigning a requested packet data service requiring a higher Quality of Service (QoS) a higher priority than a requested service requiring a lower QoS.

11. The method of claim 10, further comprising:
  allocating more bandwidth to the higher priority packet data service.

12. The method of claim 10, further comprising:
  allocating more time to the higher priority packet data service.

13. The apparatus of claim 1, wherein the priorities of the multiple packet data services are determined based on a quality of service.

14. The method of claim 4, wherein the priorities of the multiple packet data services are determined based on a quality of service.

15. The scheduler of claim 7, wherein the priorities of the multiple packet data services are determined based on a quality of service.

16. The method of claim 9, wherein the priorities of the multiple packet data services are determined based on a quality of service.

17. The apparatus of claim 1, wherein the amount of resource is at least one of transmission time, bandwidth, and a number of slots.

18. The method of claim 4, wherein the amount of resource is at least one of transmission time, bandwidth, and a number of slots.

19. The method of claim 9, wherein the amount of resource is at least one of transmission time, bandwidth, and a number of slots.

20. A method for providing multiple packet data services in each of a plurality of mobile stations using a packet data channel in a communication system, comprising:
  determining an amount of resources allocated to each mobile station based on priorities of the mobile stations; and
  determining at a base station an amount of resource allocated to each packet data service of the multiple packet data services based on packet data service priorities within the resources allocated to each mobile station.

21. The method of claim 20, wherein the amount of resource is at least one of transmission time, bandwidth, and a number of slots.

22. The method of claim 20, wherein the packet data service priorities are determined based on a quality of service.

23. The scheduler of claim 7, wherein an amount of resource is at least one of transmission time, bandwidth, and a number of slots.

* * * * *